United States Patent
Nielsen (10) Patent No.: US 10,978,961 B2
(45) Date of Patent: Apr. 13, 2021

(54) PULSED RECTIFIER ARCHITECTURE

(71) Applicant: SCHNEIDER ELECTRIC IT CORPORATION, West Kingston, RI (US)

(72) Inventor: Henning Roar Nielsen, Brenderup (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 8 days.

(21) Appl. No.: 16/205,579

(22) Filed: Nov. 30, 2018

(65) Prior Publication Data

US 2020/0177094 A1    Jun. 4, 2020

(51) Int. Cl.
*H02M 7/06* (2006.01)
*H01F 30/12* (2006.01)
*H02J 9/06* (2006.01)

(52) U.S. Cl.
CPC .............. *H02M 7/06* (2013.01); *H01F 30/12* (2013.01); *H02J 9/062* (2013.01)

(58) Field of Classification Search
CPC ............ H02M 7/06; H01F 30/12; H02J 9/062
USPC .......................................................... 307/64
See application file for complete search history.

(56) References Cited

U.S. PATENT DOCUMENTS

| | | | | |
|---|---|---|---|---|
| 6,031,739 A | * | 2/2000 | He | H02M 1/4216 323/222 |
| 8,982,595 B2 | | 3/2015 | Abdollahi | |
| 2005/0057210 A1 | * | 3/2005 | Ueda | H02M 5/458 318/801 |
| 2006/0043792 A1 | * | 3/2006 | Hjort | H02J 9/062 307/1 |
| 2010/0270947 A1 | * | 10/2010 | Chang | H02M 3/33569 315/294 |
| 2013/0235626 A1 | | 9/2013 | Jang et al. | |
| 2017/0332510 A1 | * | 11/2017 | Sarti | H01M 2/10 |
| 2020/0127554 A1 | * | 4/2020 | Toyodome | H02P 27/06 |

FOREIGN PATENT DOCUMENTS

DE    3612906 A1    10/1987
EP    1710890 A2    10/2006

OTHER PUBLICATIONS

Extended European Search Report from corresponding European Application No. 19211337.1 dated Apr. 7, 2020.
Sewan Choi et al., New 24-Pulse Diode Rectifier Systems for Utility Interface of High Power AC Motor Drives, Seoul National University of Technology, downloaded on Dec. 12, 2008 from IEEE Xplore, pp. 925-931.

* cited by examiner

*Primary Examiner* — Michael R. Fin
(74) *Attorney, Agent, or Firm* — Lando & Anastasi, LLP (57) ABSTRACT

According to one aspect of the present disclosure, a method is provided including acts of receiving input Alternating Current (AC) power, providing the input AC power to at least one diode bridge to generate Direct Current (DC) power, providing, by the at least one diode bridge, the DC power to at least one set of diodes, providing, by the at least one set of diodes, the DC power to at least one output reactor, and providing, by the at least one output reactor, the DC power to an output.

18 Claims, 7 Drawing Sheets

PULSED RECTIFIER ARCHITECTURE

BACKGROUND OF DISCLOSURE

1. Field of Disclosure

The present disclosure relates generally to systems and methods for power rectification.

2. Discussion of Related Art

The use of power devices, such as Uninterruptible Power Supplies (UPS), to provide regulated, uninterrupted power for sensitive and/or critical loads, such as computer systems and other data processing systems, is known. Known UPSs include online UPSs, offline UPSs, line-interactive UPSs, as well as others. Online UPSs provide conditioned AC power as well as back-up AC power upon interruption of a primary source of AC power. Offline UPSs typically do not provide conditioning of input AC power, but do provide back-up AC power upon interruption of the primary AC power source. Line-interactive UPSs are similar to offline UPSs in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, a DC-AC inverter generates an AC output voltage to the load. Since the DC bus is powered either by mains or the battery, the output power of the UPS is uninterrupted if the mains fails and the battery is sufficiently charged. A conventional offline UPS normally connects a load directly to utility power. When utility power is insufficient to power the load, the offline UPS operates a DC-AC inverter to convert DC power from a backup power source (e.g., a battery) into desired AC power, which is provided to the load. Each of the foregoing types of UPS may be implemented in connection with a power modulation stage, which may include a power converter module and a power inverter module.

SUMMARY

At least one aspect of the disclosure is directed to a method comprising receiving input Alternating Current (AC) power, providing the input AC power to at least one diode bridge to generate Direct Current (DC) power, providing, by the at least one diode bridge, the DC power to at least one set of diodes, providing, by the at least one set of diodes, the DC power to at least one output reactor, and providing, by the at least one output reactor, the DC power to an output.

In one embodiment, the method includes providing the input AC power to a primary winding of a transformer, providing, by the primary winding of the transformer, transformed AC power to a first secondary winding and a second secondary winding, and providing, by the first secondary winding and the second secondary winding, the transformed AC power to the at least one diode bridge. In an embodiment, the method includes providing the input AC power to at least one diode bridge to generate DC power includes providing the input AC power to a first diode bridge and a second diode bridge, providing the DC power to the at least one set of diodes includes providing the DC power to a first set of diodes and a second set of diodes, and providing the DC power to the at least one output reactor includes providing the DC power to a first output reactor and a second output reactor.

In at least one embodiment, the first diode bridge, the first set of diodes, and the first output reactor alternately conduct with respect to the second diode bridge, the second set of diodes, and the second output reactor. In some embodiments, the first output reactor and the second output reactor are configured to alternately conduct without reaching saturation. In an embodiment, the at least one output reactor is configured to operate in continuous conduction mode responsive to the rectifier providing at least 0.5% of a rated load.

In embodiments, the method further includes selectively controlling one or more switching elements to limit a charging current to an output capacitor, and limit a discharging current to the output capacitor. In some embodiments, the method further includes providing, by the at least one diode bridge, the DC power to the at least one output reactor.

According to one aspect of the disclosure, an Uninterruptible Power Supply (UPS) system is provided, comprising an input configured to receive input Alternating Current (AC) power, an energy storage device configured to store energy and provide backup power, a UPS output configured to provide output power derived from at least one of the AC power and the backup power, and a rectifier coupled to the input and coupled to the UPS output, the rectifier including at least one diode bridge coupled to the input, at least one set of diodes coupled to the at least one diode bridge, at least one output reactor coupled to the at least one set of diodes, and a rectifier output coupled to the at least one output reactor.

In one embodiment, the rectifier further comprises a transformer including a primary winding coupled to the input, and at least one secondary winding configured according to an extended delta configuration and coupled to the primary winding. In some embodiments, the at least one diode bridge includes a first diode bridge and a second diode bridge, and the at least one set of diodes includes a first set of diodes coupled to the first diode bridge, and a second set of diodes coupled to the second diode bridge.

In some embodiments, the at least one output reactor includes an output reactor having a first input tap, a second input tap, and an output tap, and wherein the first input tap is coupled to the first set of diodes, the second input tap is coupled to the second set of diodes, and the output tap is coupled to the rectifier output. In one embodiment, the output reactor is further coupled to the first diode bridge and the second diode bridge. In an embodiment, the at least one output reactor includes a first output reactor having an output tap, and a second output reactor having an output tap.

In at least one embodiment, the first output reactor is configured to be coupled to the first diode bridge and the second set of diodes, the output tap of the first output reactor is configured to be coupled to the rectifier output, the second output reactor is configured to be coupled to the second diode bridge and the first set of diodes, and the output tap of the second output reactor is configured to be coupled to the rectifier output.

In embodiments, the system further includes a switching circuit coupled to the at least out output reactor and the rectifier output, and an output capacitor configured to be coupled to the switching circuit. In at least one embodiment, the switching circuit is configured to selectively limit a discharge current of the output capacitor responsive to detecting a short-circuit at the rectifier output, and selectively limit a charging current to the output capacitor responsive to detecting a pre-charge condition has not been satisfied.

According to one aspect of the present disclosure, a rectifier is provided comprising an input configured to receive input AC power, at least one diode bridge coupled to the input, at least one set of diodes coupled to the at least one diode bridge, at least one output reactor coupled to the at least one set of diodes, and a rectifier output coupled to the at least one output reactor.

In one embodiment, the at least one diode bridge includes a first diode bridge and a second diode bridge, and the at least one set of diodes includes a first set of diodes coupled to the first diode bridge, and a second set of diodes coupled to the second diode bridge. In some embodiments, the at least one output reactor includes an output reactor having a first input tap, a second input tap, and an output tap, and wherein the first input tap is coupled to the first set of diodes, the second input tap is coupled to the second set of diodes, and the output tap is coupled to the rectifier output.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects and examples are directed generally to an improved power rectifier. Some embodiments of the improved rectifier include a novel configuration of elements to maximize power conversion efficiency, improve output voltage stability, and simplify design requirements.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Rectifiers may be broadly categorized as either active rectifiers or passive rectifiers. Active rectifiers, such as switching regulators, include one or more switching elements which are selectively controlled to produce rectified DC power. Passive rectifiers, in contrast, may not utilize switching elements to produce rectified DC power.

Conventional passive rectifiers may be able to obtain very high efficiencies. For example, where the passive rectifier includes a diode bridge, most losses may be due to losses in the diode bridge. Losses through passive components, such as diodes, may be considered relatively small as compared to losses through active components in active rectifiers, such as switches.

Some conventional passive rectifiers may be configured to rectify 3-phase AC power. Examples of 3-phase rectifier topologies include 6-, 12-, 18-, and 24-pulse rectifier topologies. Generally speaking, higher pulse counts typically require more complex transformer winding schemes and an increased number of diodes. However, higher pulse counts typically yield higher power factors and reduced Total Harmonic Distortion (THD) of drawn line current.

Figure 1A:
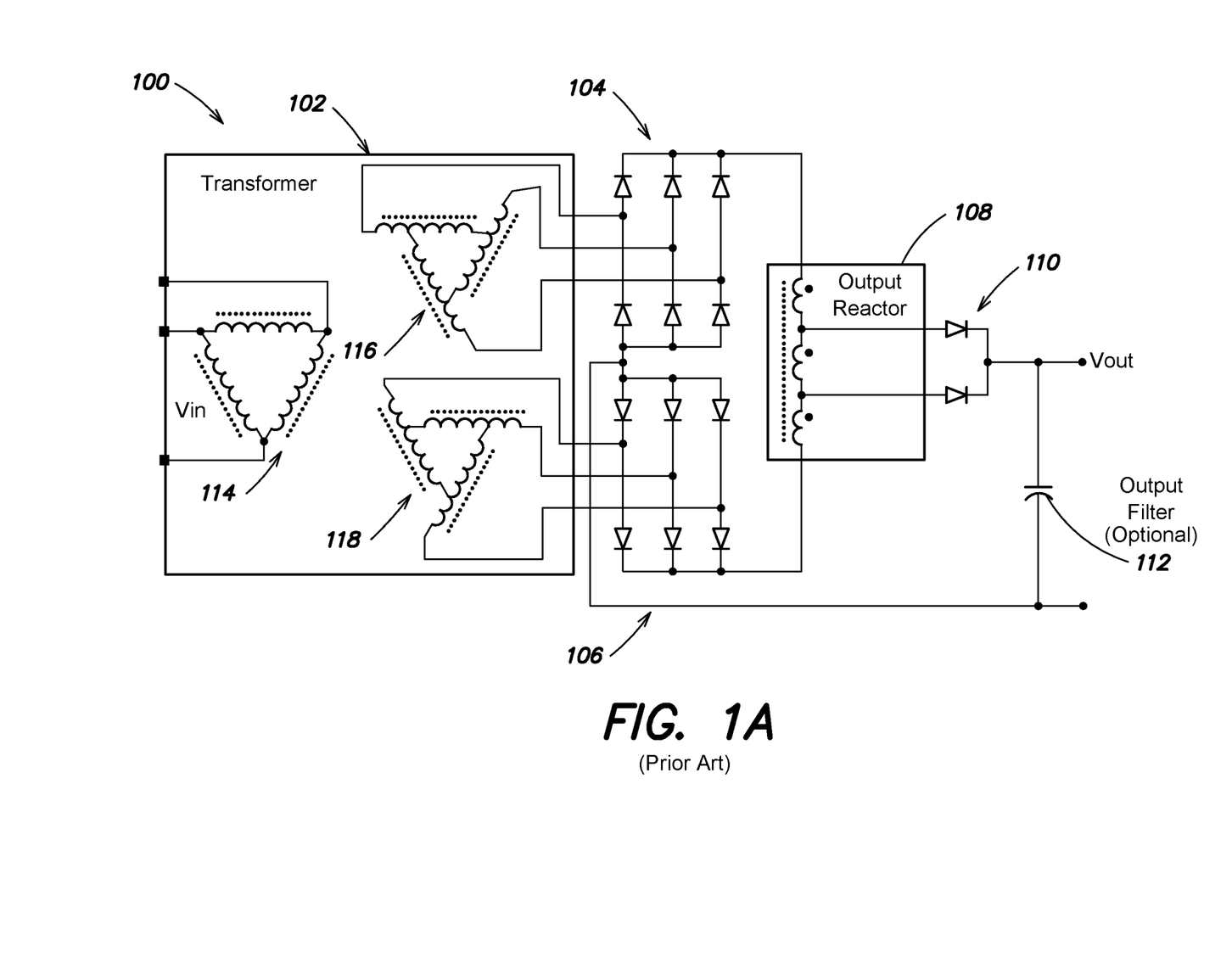
FIG. 1A illustrates a schematic diagram of a rectifier.

For example, FIG. 1A illustrates a conventional rectifier 100. The rectifier 100 is configured according to a 24-pulse topology. The rectifier 100 includes a transformer 102, a first diode bridge 104, a second diode bridge 106, an output reactor 108, output diodes 110, and an optional output filter capacitor 112. The transformer 102 includes a primary winding 114, a first secondary winding 116, and a second secondary winding 118. The transformer 102 is configured according to a topology known in the art as an "extended delta" configuration. However, alternate configurations for the transformer 102 are possible.

In a 12-pulse rectifier topology, the output might be tapped directly from a midpoint of the output reactor 108 without the output diodes 110. However, in such a configuration, input THD may be unacceptably high. The output diodes 110, which are connected to two taps on the output reactor 108, allow current to alternately conduct through the output diodes 110, enabling 24-pulse input current with reduced input THD.

Figure 1B:
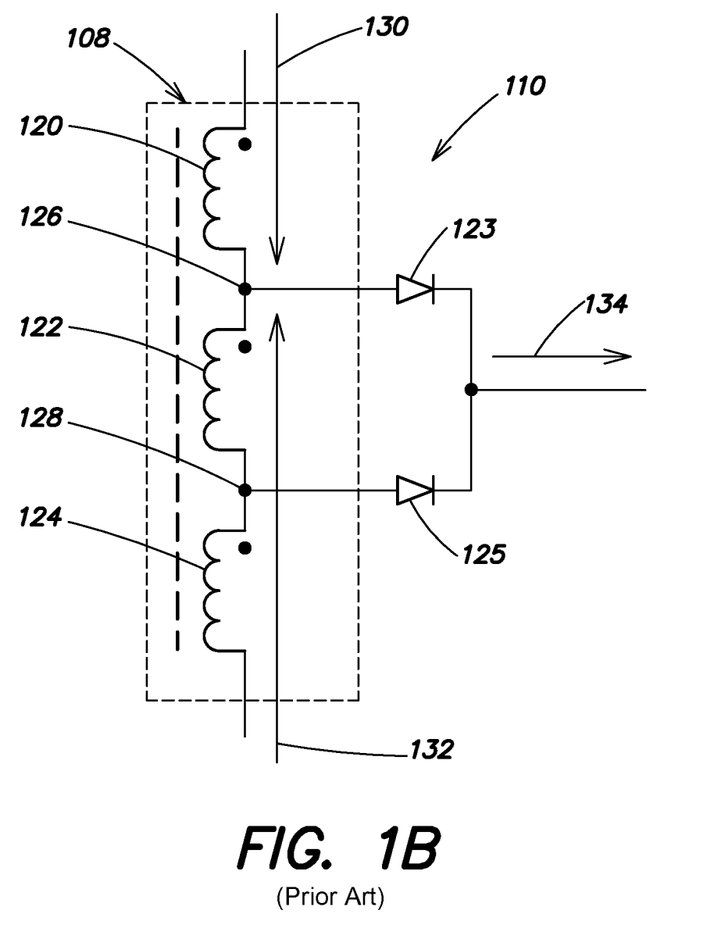
FIG. 1B illustrates a schematic diagram of an output reactor.

FIG. 1B illustrates the output reactor 108 and output diodes 110 in greater detail. The output reactor 108 includes a first winding 120, a second winding 122, and a third winding 124. The output diodes 110 include a first diode 123 and a second diode 125. The first winding 120 and the second winding 122 are connected via a first node 126. The second winding 122 and the third winding 124 are connected via a second node 128. The first winding 120 and the third winding 124 have an identical number of windings. The second winding 122 has twice as many windings as the first winding 120 and the third winding 124.

In the illustrated embodiment, an instantaneous voltage at the first node 126 is greater than an instantaneous voltage at the second node 128. Accordingly, the first diode 123 will conduct current, and the second diode 125 will not conduct current, because a voltage at the cathode of the first diode 123 and the second diode 125, which is roughly equivalent to the voltage at the first node 126, is greater than a voltage at the anode of the second diode 125, which is equivalent to the voltage at the second node 128. The second diode 125 is therefore in a reverse-biased, non-conducting state.

A first current 130 conducts across the first winding 120 to the first node 126. A second current 132 conducts across the second winding 122 and the third winding 124 to the first node 126. A summation of the currents conducts across the first diode 123 to yield an output current 134. Due to the winding ratio of 1:2:1 discussed above, in the illustrated embodiment the first current 130 is approximately 75% of the output current 134, and the second current 132 is approximately 25% of the output current 134.

At alternate points in time, an instantaneous voltage at the second node 128 will be greater than an instantaneous voltage across the first node 126, and vice-versa. For example, because the first current 130 derives from the first secondary winding 116 and the second current 132 derives from the second secondary winding 118, the relative voltages at the first node 126 and the second node 128 will vary as a function of the voltage provided by the secondary windings of the transformer 102.

In one example, a phase shift of 30° exists between the voltages produced by the secondary windings of the transformer 102. Therefore, ripple voltage produced by each of the 6-pulse diode bridges 104 and 106 are identical in waveform but shifted by $\frac{1}{12}^{th}$ of a line cycle. An AC voltage of six times the line frequency appears across the reactor windings 120-124, yielding an alternating voltage difference between the first node 126 and the second node 128. Ideally, the amount of time at which the instantaneous voltage at the first node 126 is greater than the voltage at the second node 128 is roughly identical to the amount of time at which the instantaneous voltage at the first node 126 is less than the voltage at the second node 128.

The rectifier 100 suffers from several drawbacks. For example, a first problem is that the rectifier 100 has high diode losses, in part due to the addition of the output diodes 110. Each current path in the rectifier 100 includes three diodes. More specifically, current through each phase of the power rectified by the rectifier 100 must pass through a diode from each of the first diode bridge 104, the second diode bridge 106, and the output diodes 110. Because each diode consumes power and therefore lowers the efficiency of the rectifier 100, power efficiency generally decreases as the number of diodes in a current path increases. Moreover, because all current passes through the output diodes 110, the output diodes 110 consume a significant amount of power.

A second problem with the rectifier 100 is that the first secondary winding 116 and the second secondary winding 118 typically must have very well-balanced impedances and, therefore, very well-balanced leakage inductances, to maintain ideal current balancing between the first secondary winding 116 and the second secondary winding 118. If a current balance is not maintained, then various detrimental effects may develop, including increased input THD, reduced efficiency, and an increase in temperature of the transformer 102. This imbalance is exacerbated by saturation of the output reactor 108, as discussed below.

A third problem with the rectifier 100 is that, because of the imbalance of the first secondary winding 116 and the second secondary winding 118, the output reactor 108 typically must include an air-gapped core, or a low-permeability core material. Otherwise, the winding imbalance may lead to saturation of the core of the output reactor 108. Although implementing an air-gapped core may avoid saturation of the output reactor 108, output voltage characteristics may be negatively impacted. For example, accurately controlling an output voltage may be difficult when an output load is less than approximately 10% of a rated load.

Embodiments of the present disclosure provide rectifier topologies which address at least some of the foregoing disadvantages of prior art rectifier topologies. Some embodiments provide a rectifier in which current paths include two, rather than three, diodes, none of which are connected directly to a rectifier output, thereby reducing diode losses. Furthermore, some embodiments reduce current imbalance caused by transformer winding imbalance by several times as compared to prior art topologies. Finally, some embodiments eliminate or mitigate risk of output reactor core saturation, which enables simpler reactor designs that do not require an air-gapped core and therefore do not provide for more accurate output voltage control at loads significantly less than a rated load.

Figure 2A:
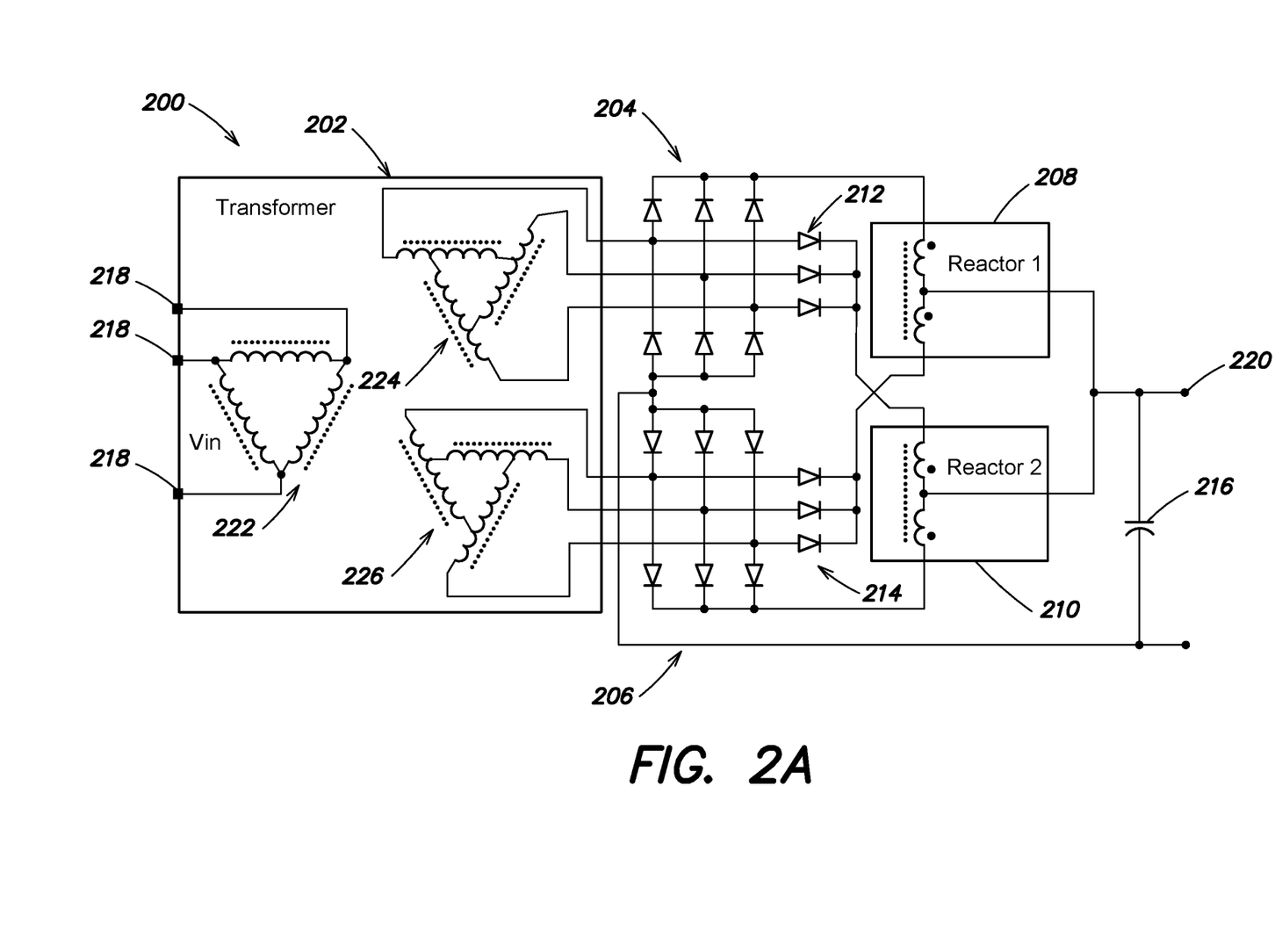
FIG. 2A illustrates a schematic diagram of a rectifier according to an embodiment.

FIG. 2A illustrates a rectifier 200 according to one embodiment of the present disclosure. The rectifier 200 includes a transformer 202, a first diode bridge 204, a second diode bridge 206, a first output reactor 208, a second output reactor 210, a first set of diodes 212, a second set of diodes 214, a capacitor 216, inputs 218, and an output 220. The transformer 202 includes a primary winding 222, a first secondary winding 224, and a second secondary winding 226.

The input 218 is coupled to the primary winding 222, and is configured to be coupled to a power source (for example, an AC mains power source). The primary winding 222 is coupled to the input 218, and is inductively coupled to the first secondary winding 224 and the second secondary winding 226. The first secondary winding 224 is inductively coupled to the primary winding 222, and is coupled to the first diode bridge 204 and the first set of diodes 212. The second secondary winding 226 is inductively coupled to the primary winding 222, and is coupled to the second diode bridge 206 and the second set of diodes 214.

The first diode bridge 204 is coupled to the first secondary winding 224, the first output reactor 208, the first set of diodes 212, and the second diode bridge 206. The second diode bridge 206 is coupled to the second secondary winding 226, the second output reactor 210, the second set of diodes 214, and the first diode bridge 204.

The first output reactor 208 is coupled to the first diode bridge 204, the second set of diodes 214, the output 220, the capacitor 216, and the second output reactor 210. The second output reactor 210 is coupled to the second diode bridge 206, the first set of diodes 212, the output 220, the capacitor 216, and the first output reactor 208.

The first set of diodes 212 are coupled to the first secondary winding 224, the first diode bridge 204, and the second output reactor 210. The second set of diodes 214 are coupled to the second secondary winding 226, the second diode bridge 206, and the first output reactor 208. The capacitor 216 is coupled to the first output reactor 208, the second output reactor 210, and the output 220. The output 220 is coupled to the first output reactor 208, the second output reactor 210, the capacitor 216, and is configured to be coupled to a load (not illustrated).

Figure 2B:
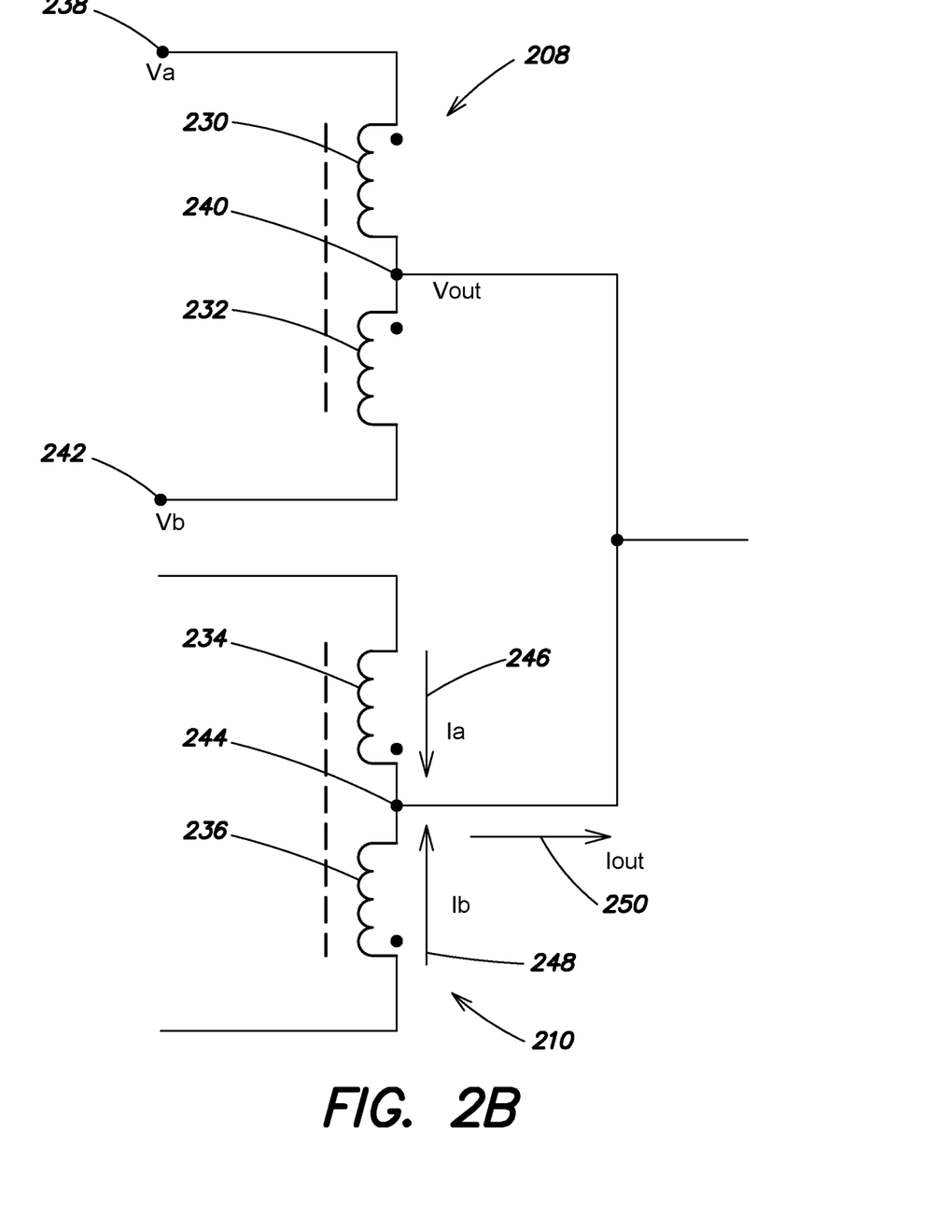
FIG. 2B illustrates a schematic diagram of a first output reactor and a second output reactor according to an embodiment.

Operation of the rectifier 200 will now be described in connection with FIG. 2B. FIG. 2B illustrates the first output reactor 208 and the second output reactor 210. For clarity of illustration only, voltage characteristics of the first output reactor 208 and the second output reactor 210 are discussed using the first output reactor 208 as an example, and current characteristics of the first output reactor 208 and the second output reactor 210 are discussed using the second output reactor 210 as an example.

The first output reactor 208 includes a first winding 230 and a second winding 232, and the second output reactor 210 includes a third winding 234 and a fourth winding 236. The first winding 230 is coupled to a first node 238 at a first connection, and a second node 240 at a second connection. The second winding 232 is coupled to the second node 240 at a first connection, and a third node 242 at a second connection. The third winding 234 is coupled to the fourth winding 236 via a fourth node 244. The third winding 234 conducts a first current 246 to the second node 240. The fourth winding 236 conducts a second current 248 to the second node 240. An output current 250 is provided from the second node 244.

The first output reactor 208 and the second output reactor 210 provide voltages in proportion to a turns ratio of the reactors' windings. For example, with reference to the first output reactor 208, a voltage at the first node 240 may be expressed as, $$Vout = Va * \frac{N2}{N1+N2} + Vb * \frac{N1}{N1-N2} \quad (1)$$

where $V_{out}$ is a voltage at the first node 240, $V_a$ is a voltage at the third node 238, $V_b$ is a voltage at the fourth node 242, N1 is a number of windings of the first winding 230, and N2 is a number of windings of the second winding 232. The second output reactor 210 may provide an output voltage according to a similar relationship.

Similarly, the first output reactor 208 and the second output reactor 210 provide currents in proportion to a turns ratio of the reactors' windings. For example, with reference to the second output reactor 210, the first current 246 and the second current 248 may be expressed as, $$Ia = Iout * \frac{N2}{(N1+N2)} \quad (2)$$

$$Ib = Iout * \frac{N1}{(N1+N2)} \quad (3)$$

where $I_a$ corresponds to the first current 246, $I_b$ corresponds to the second current 248, $I_{out}$ corresponds to the output current 250, N1 is a number of windings of the third winding 234, and N2 is a number of windings of the fourth winding 236. The first output reactor 208 may provide an output current according to similar relationships.

In some embodiments, it may be advantageous for current to be provided by only one output reactor of the first output reactor 208 and the second output reactor 210. For example, current may be provided only by an output reactor which is providing a greater instantaneous output voltage at a given instance pursuant to Equation (1). When one output reactor is providing a current pursuant to Equations (2) and (3), the other output reactor may be providing zero or negligible current.

In some embodiments, a turns ratio of the first output reactor 208 and the second output reactor 210 may be selected such that a total THD is reduced. For example, a turns ratio of 1:3 may be considered an ideal turns ratio to minimize the total THD. Where a turns ratio of 1:3 is implemented with respect to the second output reactor 210, a magnitude of the first current 246 may be approximately three times a magnitude of the second current 248, such that 25% of the output current 250 derives from the first current 246 and 75% of the output current 250 derives from the second current 248.

In other embodiments, alternate turns ratios may be implemented. Furthermore, in some embodiments the first output reactor 208 and the second output reactor 210 may have an identical turns ratio, whereas in other embodiments the first output reactor 208 and the second output reactor 210 may have different turns ratios.

A first advantage of the rectifier 200 relative to the rectifier 100 includes reduced diode losses. Current provided by the first output reactor 208 and the second output reactor 210 passes through a number of diodes which may correspond to a number of phases of AC power provided by the rectifier 200. In the embodiment illustrated by FIG. 2A, the input 218 is configured to receive 3-phase AC power. Accordingly, the first diode bridge 204 and the second diode bridge 206 each include six diodes, and the first set of diodes 212 and the second set of diodes 214 each include three diodes.

Although the total number of diodes in the rectifier 200 is greater than the total number of diodes in the conventional rectifier 100, an average current through the diodes in the rectifier 200 is less than an average current through the diodes in the rectifier 100. Moreover, each current path in the rectifier 200 includes at most two diodes, whereas each current path in the rectifier 100 includes as many as three diodes.

Conduction losses through diodes depend at least partially on an average current and a Root-Mean-Square (RMS) current through the diodes. For example, typical losses through a diode may be expressed as, $$P_{loss} = I_{avg} * V_{(TO)} + I_{RMS}^2 * r_T \quad (4)$$

where $P_{loss}$ is a power loss through a diode, $I_{avg}$ is an average current through the diode, $V_{(TO)}$ is a threshold voltage of the diode, $I_{RMS}$ is an RMS current through the diode, and $r_T$ is a slope resistance of the diode.

Pursuant to Equation (4), diode losses are proportional to the voltage threshold of the diode and the slope resistance of the diode. In some embodiments, it may be relatively easy to select a diode having a negligibly small slope resistance. Accordingly, power losses due to the slope resistance may be substantially minimized. However, the threshold voltage may be more difficult to minimize. Because the threshold voltage is non-negligible and may be relatively fixed, it may be advantageous to minimize the average current $I_{avg}$ to minimize power loss $P_{loss}$ through the diode.

In the prior art rectifier 100, the output diodes 110 are constantly conducting an average current. Where the first diode 123 and the second diode 125 alternately conduct in equal proportions, the first diode 123 and the second diode 125 each conduct half of the average current. Each diode of the first diode bridge 104 and the second diode bridge 106 is configured to conduct one of three phases of input power and will therefore conduct approximately $\frac{1}{6}^{th}$ of the average current.

In the rectifier 200, the first diode bridge 204 and the second diode bridge 206 alternately conduct, and the first set of diodes 212 and the second set of diodes 214 alternately conduct, where each diode of the first diode bridge 204, the second diode bridge 206, the first set of diodes 212, and the second set of diodes 214 conducts one phase of three phases of input power. Half of the diodes of the rectifier 200 conduct current which is provided to a positive terminal of either the first output reactor 208 or the second output reactor 210, and half of the diodes of the rectifier 200 conduct current which is provided to a negative terminal of either the first output reactor 208 or the second output reactor 210.

In some embodiments, a positive winding of the first output reactor 208 and the second output reactor 210 has a greater number of turns than a corresponding negative winding. In these embodiments, the half of the diodes of the rectifier 200 which provide current to the positive terminals of the first output reactor 208 and the second output reactor 210 each conduct approximately $\frac{1}{6}^{th}$ of the output current. The half of the diodes of the rectifier 200 which provide current to the negative terminals of the first output reactor 208 and the second output reactor 210 each conduct approximately $\frac{1}{18}^{th}$ of the output current, or the amount of current provided to the positive terminals of the first output reactor 208 and the second output reactor 210 divided by the exemplary turns ratio, three.

In summary, in the rectifier 100, twelve diodes (i.e., diodes from the first diode bridge 104 and the second diode bridge 106) conduct approximately $\frac{1}{6}^{th}$ of the average current, and two diodes (i.e., the output diodes 110) conduct approximately half of the average current. In the rectifier 200, nine diodes (i.e., diodes conducting current which is provided to positive terminals of the first output reactor 208 and the second output reactor 210) each conduct approximately $\frac{1}{6}^{th}$ of the average current, and nine diodes (i.e., diodes conducting current which is provided to negative terminals of the first output reactor 208 and the second output reactor 210) each conduct approximately $\frac{1}{18}^{th}$ of the average current. Therefore, where power losses are correlated to average current pursuant to Equation (4), the rectifier 200 experiences a reduction in power losses of approximately 33% relative to the rectifier 100.

A second advantage of the rectifier 200 relative to the rectifier 100 includes mitigating reactor saturation. For example, the transformer 102 of the rectifier 100 includes two secondary windings which each provide current to the rectifier 100. If any imbalance exists between the two secondary windings, such as an imbalance between leakage impedances, a net non-zero DC current will be provided to the output rectifier 108, which will generate a magnetic field build-up.

Because the output rectifier 108 is constantly conducting, the magnetic field will continue to build up in the output reactor 108 due to the net non-zero DC current without being able to release built-up magnetic energy. To avoid the output reactor 108 reaching saturation, the output reactor 108 is typically implemented with an air-gapped core or other low-permeability material to account for the unavoidable magnetic field build-up. Implementing an air-gapped core or other low-permeability material incurs several disadvantages, as discussed above.

In contrast, the rectifier 200 is resistant to substantial imbalances between the first secondary winding 224 and the second secondary winding 226. Unlike the single output reactor 108, which is always conducting, the first output reactor 208 and the second output reactor 210 alternately conduct. Accordingly, even if a substantial imbalance exists between the first secondary winding 224 and the second secondary winding 226, the first output reactor 208 and the second output reactor 210 are able to release built-up magnetic energy at periods during which they are not conducting current. Each of the first output reactor 208 and the second output reactor 210 start a new conduction cycle from an approximately-zero-current state and do not reach saturation.

The resistance to saturation exhibited by the first output reactor 208 and the second output reactor 210 further improves load balancing of the transformer 202. For certain implementations of the transformer 202, at least a small imbalance between the impedances of the first secondary winding 224 and the second secondary winding 226 may be present. An imbalance in the impedances of the first secondary winding 224 and the second secondary winding 226 may result in an imbalance in load currents, which may be further exacerbated by saturation in the first output reactor 208 and the second output reactor 210.

However, as discussed above, the first output reactor 208 and the second output reactor 210 are resistant to the effects of saturation. Accordingly, an imbalance in load currents provided by the first secondary winding 224 and the second secondary winding 226 is commensurately reduced and significantly more manageable as compared to the transformer 102. For example, for an identical winding imbalance, an imbalance in load currents provided by the first secondary winding 224 and the second secondary winding 226 may be more than three times smaller than an imbalance in load currents provided by the first secondary winding 116 and the second secondary winding 118.

The resistance to saturation also improves output characteristics of the rectifier 200 compared to the rectifier 100. At relatively low loads, the magnetizing current in the output reactor 108—which is relatively large due to the air-gapped or low-permeability core—may be substantial relative to the output load current. Below a certain threshold load current, the voltage across the output reactor 108 may approach zero and enter a Discontinuous Conduction Mode (DCM). The output voltage of the rectifier 100 may rise adversely because, rather than being an average of voltage from the first diode bridge 104 and the second diode bridge 106, the voltage follows the highest voltage from the diode bridges 104, 106.

Conversely, because the first output reactor 208 and the second output reactor 210 may be implemented with a higher-permeability core, self-inductance is increased and magnetizing current is reduced such that a load power threshold between DCM and Continuous Conduction Mode (CCM) is significantly lower. For example, the threshold may be approximately 0.5% of a rated load in some embodiments (e.g., a 2 kW threshold for a 400 kW rating). Accordingly, the rectifier 200 is capable of sustaining load requirements with significantly lower voltage requirements as compared to, for example, the rectifier 100.

Figure 3:
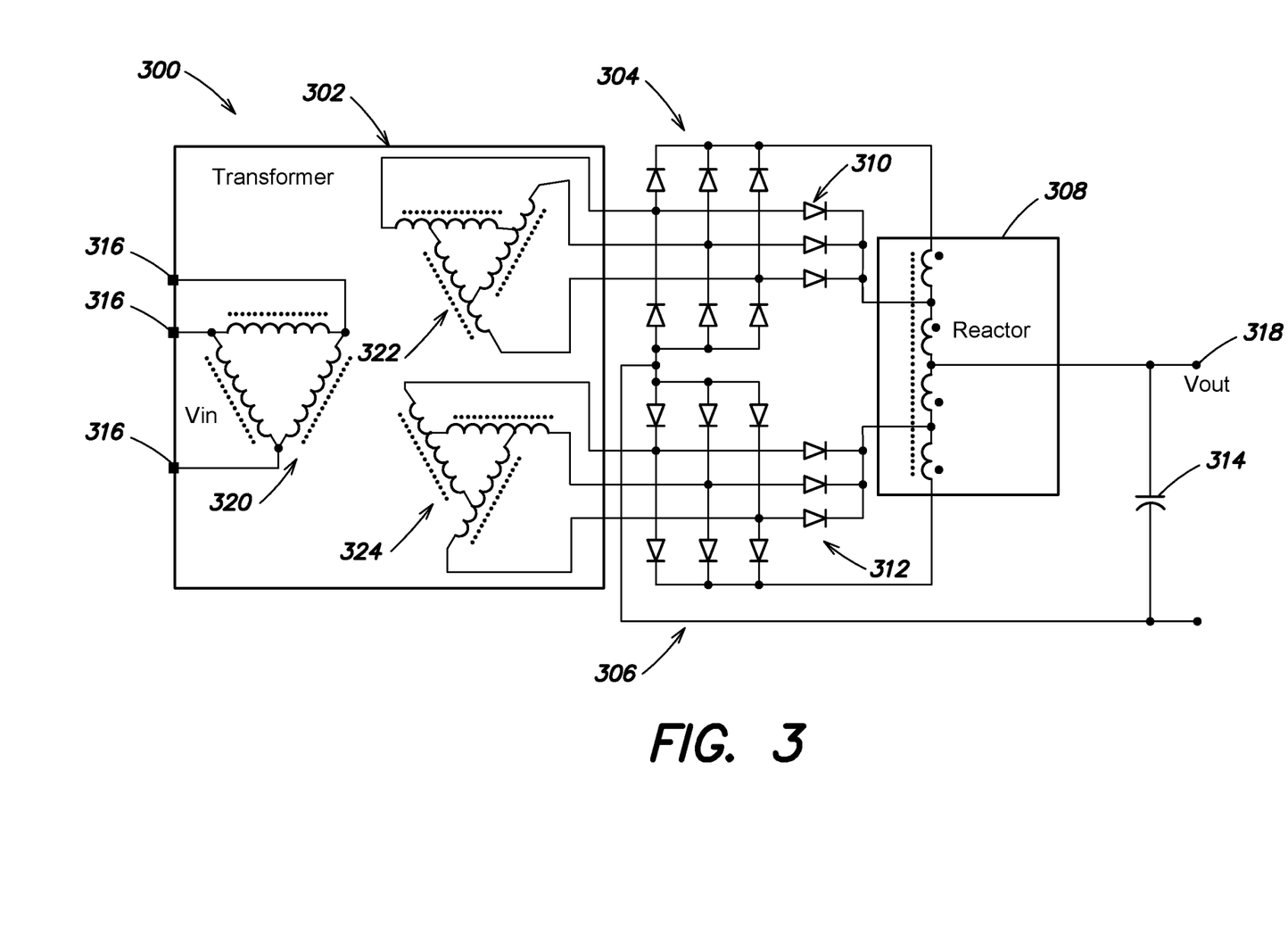
FIG. 3 illustrates a schematic diagram of a rectifier according to an embodiment.

FIG. 3 illustrates a rectifier 300 according to one embodiment of the disclosure. The rectifier 300 includes a transformer 302, a first diode bridge 304, a second diode bridge 306, an output reactor 308, first diodes 310, second diodes 312, a capacitor 314, inputs 316, and an output 318. The transformer 302 includes a primary winding 320, a first secondary winding 322, and a second secondary winding 324.

The input 316 is coupled to the primary winding 320, and is configured to be coupled to a power source (for example, an AC mains power source). The primary winding 320 is coupled to the input 316, and is inductively coupled to the first secondary winding 322 and the second secondary winding 324. The first secondary winding 322 is inductively coupled to the primary winding 320, and is coupled to the first diode bridge 304 and the first diodes 310. The second secondary winding 324 is inductively coupled to the primary winding 320, and is coupled to the second diode bridge 306 and the second diodes 312.

The first diode bridge 304 is coupled to the first secondary winding 322, the output reactor 308, the first diodes 310, and the second diode bridge 306. The second diode bridge 306 is coupled to the second secondary winding 324, the output reactor 308, the second diodes 312, and the first diode bridge 304. The output reactor 308 is coupled to the first diode bridge 304, the second diodes 310, the output 318, the capacitor 314, the second diodes 312, and the second diode bridge 306.

The first diodes 310 are coupled to the first secondary winding 322, the first diode bridge 304, and the output reactor 308. The second diodes 312 are coupled to the second secondary winding 324, the second diode bridge 306, and the output reactor 308. The capacitor 314 is coupled to the output reactor 308, and the output 318. The output 318 is coupled to the output reactor 308, the capacitor 314, and is configured to be coupled to a load (not illustrated).

The rectifier 300 may be particularly advantageous because only one output reactor 308 is implemented. In some examples, it may be more cost-effective to reduce a number of output reactors. However, the output reactor 308 may be implemented with a higher Volt-Ampere (VA) rating to accommodate the reduction in a number of output reactors.

Figure 4:
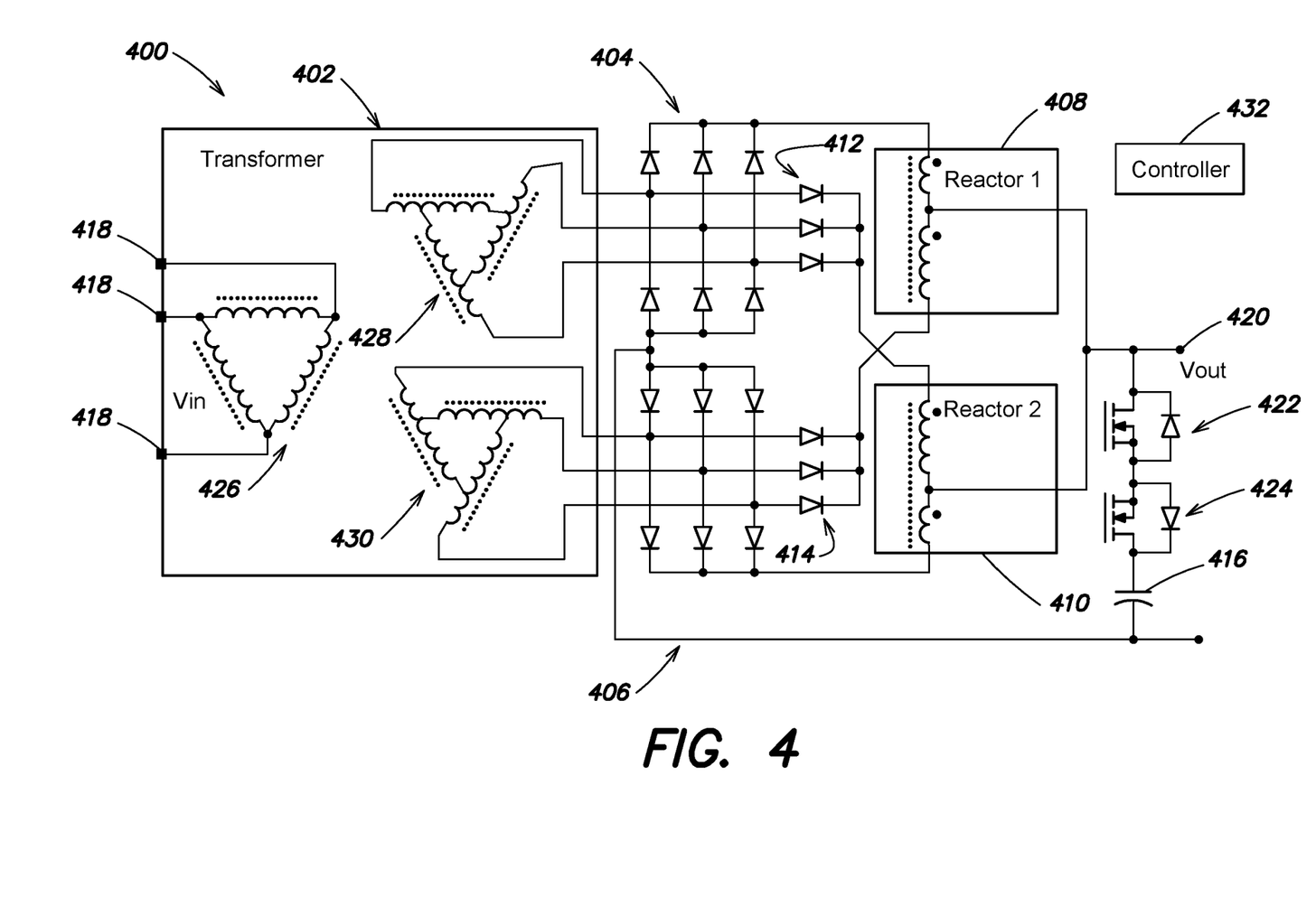
FIG. 4 illustrates a schematic diagram of a rectifier according to an embodiment.

FIG. 4 illustrates a rectifier 400 according to another embodiment of the present disclosure. The rectifier 400 includes a transformer 402, a first diode bridge 404, a second diode bridge 406, a first output reactor 408, a second output reactor 410, first diodes 412, second diodes 414, a capacitor 416, inputs 418, an output 420, a first switch 422, and a second switch 424. The transformer 402 includes a primary winding 426, a first secondary winding 428, and a second secondary winding 430. The rectifier 400 is configured to be communicatively coupled to a controller 432.

The input 418 is coupled to the primary winding 426, and is configured to be coupled to a power source (for example, an AC mains power source). The primary winding 426 is coupled to the input 418, and is inductively coupled to the first secondary winding 428 and the second secondary winding 430. The first secondary winding 428 is inductively coupled to the primary winding 426, and is coupled to the first diode bridge 404 and the first diodes 412. The second secondary winding 430 is inductively coupled to the primary winding 426, and is coupled to the second diode bridge 406 and the second diodes 414.

The first diode bridge 404 is coupled to the first secondary winding 428, the first output reactor 408, the first diodes 412, and the second diode bridge 406. The second diode bridge 406 is coupled to the second secondary winding 430, the second output reactor 410, the second diodes 414, and the first diode bridge 404.

The first output reactor 408 is coupled to the first diode bridge 404, the second diodes 414, the output 420, the first switch 422, and the second output reactor 410. The second output reactor 410 is coupled to the second diode bridge 406, the first diodes 412, the output 420, the first switch 422, and the first output reactor 408.

The first diodes 412 are coupled to the first secondary winding 428, the first diode bridge 404, and the second output reactor 410. The second diodes 414 are coupled to the second secondary winding 430, the second diode bridge 406, and the first output reactor 408. The capacitor 416 is coupled to the second switch 424. The output 420 is coupled to the first output reactor 208, the second output reactor 210, the first switch 422, and is configured to be coupled to a load (not illustrated).

The first switch 422 is coupled to the first output reactor 408, the second output reactor 410, the output 420, and the second switch 424, and is configured to be communicatively coupled to the controller 432. The second switch 424 is coupled to the first switch 422 and the capacitor 416, and is configured to be communicatively coupled to the controller 432. The controller 432 is configured to be communicatively coupled to the first switch 422 and the second switch 424.

The rectifier 400 is similar to the rectifier 200, and additionally includes a first switch 422 and a second switch 424. The first switch 422 and the second switch 424 may be configured to selectively allow current to pass responsive to receiving control signals from the controller 432. For example, the controller 432 may control the first switch 422 and the second switch 424 to limit an amount of current passing through the switches 422, 424 when the rectifier 400 is initially energized, such that the capacitor 416 is not subjected to an excessive in-rush current. After the capacitor 416 has been sufficiently charged (for example, after a pre-charge condition has been satisfied, as indicated by a minimum amount of charge on the capacitor 416), the switches 422, 424 may be maintained in a closed and conducting configuration.

In addition to modulating a charging current for the capacitor 416, the switches 422, 424 may be further utilized where it is advantageous to limit a discharge current from the capacitor 416. For example, where the output 420 is short-circuited, the switches 422, 424 may be actuated to an open and non-conducting position to prevent potentially-adverse effects of a significant current discharge from the capacitor 416. The controller 432 may be connected to a current sensor (not illustrated) configured to measure an output current of the rectifier 400 to detect such a short-circuit event.

Although the switches 422, 424 are illustrated as MOSFETs, alternate implementations of the switches 422, 424 are possible. For example, the switches 422, 424 may be implemented as PTC thermistors, NTC thermistors, BJTs, and so forth. Furthermore, although two switches are illustrated, an alternate number of switches may be implemented. The switches 424, 426 may be referred to generally as a switching circuit, or may be referred to as being included within a switching circuit.

Moreover, although the foregoing embodiments illustrate the transformers 202, 302, 402 as extended delta transformers, alternate embodiments are possible which provide phase-shifted voltage. For example, the transformers 202, 302, 402 may include Y-connected transformers, non-extended delta transformers, or a combination of both.

Improved rectifiers have been disclosed. Embodiments of the disclosed rectifiers enable significant increases in power conversion efficiency and enhancements to output power quality. The rectifiers disclosed herein may be implemented as stand-alone components, or may be implemented as part of a larger network of devices. For example, the rectifiers disclosed herein may be implemented as part of an Uninterruptible Power Supply (UPS).

Figure 5:
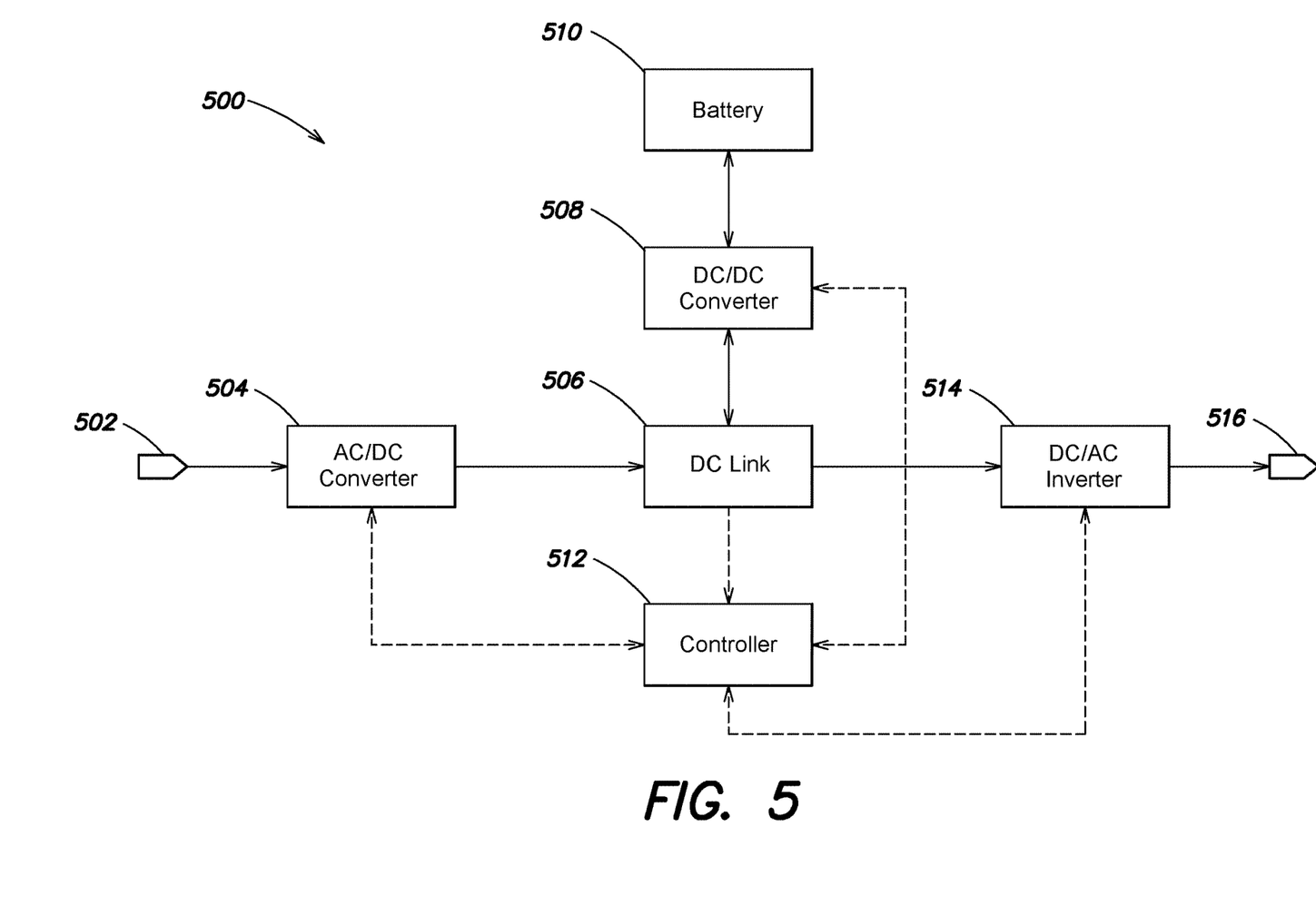
FIG. 5 illustrates a block diagram of an uninterruptible power supply.

For example, FIG. 5 is a block diagram of a UPS 500. The UPS 500 includes an input 502, an AC/DC converter 504, a DC link 506, a DC/DC converter 508, a battery 510, a controller 512, a DC/AC inverter 514, and an output 516. The input 502 is coupled to the AC/DC converter 504 and an AC power source (not pictured), such as an AC mains power supply. The AC/DC converter 504 is coupled to the input 502 and to the DC link 506, and is communicatively coupled to the controller 512.

The DC link 506 is coupled to the AC/DC converter 504, the DC/DC converter 508, and to the DC/AC inverter 514. The DC/DC converter 508 is coupled to the DC link 506 and to the battery 510, and is communicatively coupled to the controller 512. The battery 510 is coupled to the DC/DC converter 508. The DC/AC inverter 514 is coupled to the DC link 506 and to the output 516, and is communicatively coupled to the controller 512. The output 516 is coupled to the DC/AC inverter 514, and to an external load (not pictured).

The input 502 is configured to be coupled to an AC mains power source and to receive input AC power having an input voltage level. For example, the input 502 may be configured to receive one-phase AC mains power, three-phase AC mains power, or input power having a different number of phases. The UPS 500 is configured to operate in different modes of operation based on the input voltage level of the AC power provided to the input 502. When AC power provided to the input 502 is acceptable (i.e., by having parameters that meet specified values), the UPS 500 operates in a normal mode of operation.

In the normal mode of operation, AC power received at the input 502 is provided to the AC/DC converter 504. The AC/DC converter 504 converts the AC power into DC power and provides the DC power to the DC link 506. In some examples, the AC/DC converter 504 may include the rectifier 200, the rectifier 300, and/or the rectifier 400. The DC link 506 distributes the DC power to the DC/DC converter 508 and to the DC/AC inverter 514. The DC/DC converter 508 converts the received DC power and provides the converted DC power to the battery 510 to charge the battery 510. The DC/AC inverter 514 receives DC power from the DC link 506, converts the DC power into regulated AC power, and provides the regulated AC power to the output 516 to be delivered to a load.

When AC power provided to the input 502 from the AC mains power source is not acceptable (i.e., by having parameters that do not meet specified values), the UPS 500 operates in a backup mode of operation. In the backup mode of operation, DC power is discharged from the battery 510 to the DC/DC converter 508. The DC/DC converter 508 converts the received DC power and provides the DC power to the DC link 506. The DC link 506 provides the received power to the DC/AC inverter 514. The DC/AC inverter 514 receives the DC power from the DC link 506, converts the DC power into regulated AC power, and provides the regulated AC power to the output 516.

During the backup mode of operation, power provided to the DC link 506 is provided by the battery 510, and during the normal mode of operation, power provided to the DC link 506 is provided by a power source connected to the input 502. Power provided to the DC link 506 is subsequently drawn by the DC/AC inverter 514 to generate AC power, and to supply the AC power to an external load connected to the output 516. In alternate embodiments, the battery 510 may be replaced by an alternate energy storage device, such as a capacitor or flywheel.

In the UPS 500, the AC/DC converter may be implemented using one of the rectifiers 200, 300, 400. In alternate embodiments, the rectifiers 200, 300, 400 may be implemented in connection with alternate types of UPSs. For example, in some embodiments, the rectifiers 200, 300, 400 may be implemented in DC UPSs configured to provide uninterruptible DC, rather than AC, power. In some embodiments, a DC UPS may not include an inverter.

Alternate embodiments may further include a different number or configuration of components. For example, the first set of diodes 212 described above are illustrated to include three diodes, which may be equal to a number of phases of input power. In alternate embodiments, the first set of diodes 212 may include a number of diodes which is not equal to a number of phases of input power. For example, each diode of the first set of diodes 212 may be replaced by two or more diodes connected in parallel. Similar principles apply to other diodes illustrated in connection with the rectifiers 200, 300, 400.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. An Uninterruptible Power Supply (UPS) system, the system comprising:
    an input configured to receive input Alternating Current (AC) power;
    an energy storage device configured to store energy and provide backup power;
    a UPS output configured to provide output power derived from at least one of the AC power and the backup power; and
    a rectifier coupled to the input and coupled to the UPS output, the rectifier including:
        at least a first diode bridge and a second diode bridge coupled to the input;
        at least a first set of diodes and a second set of diodes coupled to at least the first diode bridge and the second diode bridge;
        at least one output reactor coupled to at least the first set of diodes and the second set of diodes, wherein a cathode of at least the first set of diodes and the second set of diodes is coupled to an input of the at least one output reactor; and
        a rectifier output coupled to the at least one output reactor.

2. The UPS system of claim 1, wherein the rectifier further comprises a transformer including:
    a primary winding coupled to the input; and
    at least one secondary winding configured according to an extended delta configuration and coupled to the primary winding.

3. The UPS system of claim 1, wherein the at least one output reactor includes an output reactor having a first input tap, a second input tap, and an output tap, and wherein the first input tap is coupled to the first set of diodes, the second input tap is coupled to the second set of diodes, and the output tap is coupled to the rectifier output.

4. The UPS system of claim 1, wherein the at least one output reactor includes a first output reactor having an output tap, and a second output reactor having an output tap.

5. The UPS system of claim 4, wherein:
    the first output reactor is configured to be coupled to the first diode bridge and the second set of diodes;
    the output tap of the first output reactor is configured to be coupled to the rectifier output;
    the second output reactor is configured to be coupled to the second diode bridge and the first set of diodes; and the output tap of the second output reactor is configured to be coupled to the rectifier output.

6. The UPS system of claim 1, further comprising:
a switching circuit coupled to the at least out output reactor and the rectifier output; and
an output capacitor configured to be coupled to the switching circuit.

7. The UPS system of claim 6, wherein the switching circuit is configured to:
selectively limit a discharge current of the output capacitor responsive to detecting a short-circuit at the rectifier output; and
selectively limit a charging current to the output capacitor responsive to detecting a pre-charge condition has not been satisfied.

8. A rectifier comprising:
an input configured to receive input AC power;
at least a first diode bridge and a second diode bridge coupled to the input;
at least a first set of diodes and a second set of diodes coupled to at least one diode bridge;
at least one output reactor coupled to at least the first set of diodes and the second set of diodes, wherein a cathode of at least the first set of diodes and the second set of diodes is coupled to an input of the at least one output reactor; and
a rectifier output coupled to the at least one output reactor.

9. The rectifier of claim 8, wherein the at least one output reactor includes an output reactor having a first input tap, a second input tap, and an output tap, and wherein the first input tap is coupled to the first set of diodes, the second input tap is coupled to the second set of diodes, and the output tap is coupled to the rectifier output.

10. The rectifier of claim 8, wherein the at least one output reactor comprises a plurality of output reactors including a first output reactor and a second output reactor.

11. The rectifier of claim 10, wherein the first diode bridge, the first set of diodes, and the first output reactor alternately conduct with respect to the second diode bridge, the second set of diodes, and the second output reactor.

12. A method comprising:
receiving input Alternating Current (AC) power;
providing the input AC power to at least a first diode bridge and a second diode bridge and at least a first set of diodes and a second set of diodes to generate Direct Current (DC) power;
providing, by at least the first diode bridge and the second diode bridge and at least the first set of diodes and the second set of diodes, the DC power to at least one output reactor; and
providing, by the at least one output reactor, the DC power to an output.

13. The method of claim 12, further comprising:
providing the input AC power to a primary winding of a transformer;
providing, by the primary winding of the transformer, transformed AC power to a first secondary winding and a second secondary winding; and
providing, by the first secondary winding and the second secondary winding, the transformed AC power to at least one diode bridge.

14. The method of claim 12, wherein
providing the DC power to the at least one output reactor includes providing the DC power to a first output reactor and a second output reactor.

15. The method of claim 14, wherein the first diode bridge, the first set of diodes, and the first output reactor alternately conduct with respect to the second diode bridge, the second set of diodes, and the second output reactor.

16. The method of claim 15, wherein the first output reactor and the second output reactor are configured to alternately conduct without reaching saturation.

17. The method of claim 12, wherein the at least one output reactor is configured to operate in continuous conduction mode responsive to the rectifier providing at least 0.5% of a rated load.

18. The method of claim 12, further comprising selectively controlling one or more switching elements to:
limit a charging current to an output capacitor; and
limit a discharging current to the output capacitor.

* * * * *